June 11, 1957 G. CORNELIUS 2,795,459
IRRIGATION SPRINKLER MOUNTING
Filed Oct. 3, 1955 2 Sheets-Sheet 2
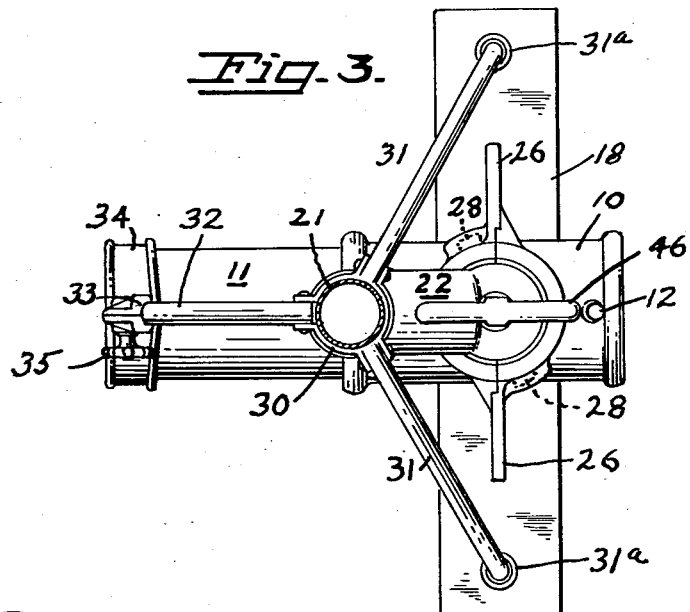
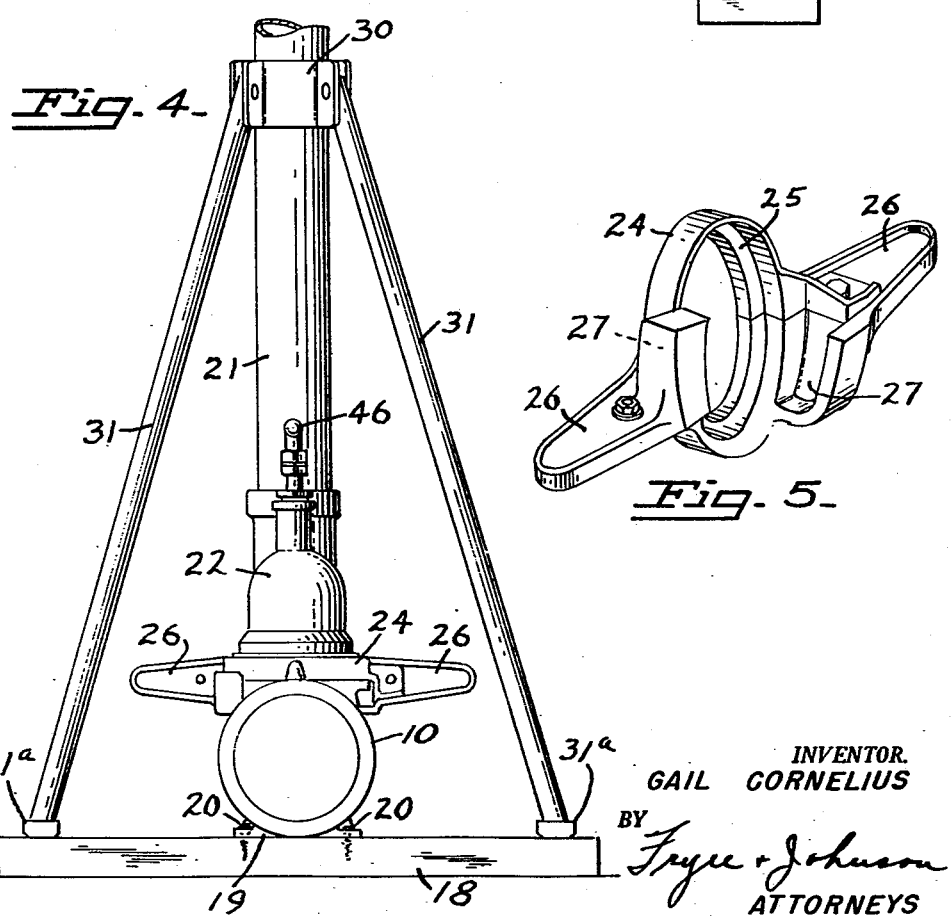
INVENTOR.
GAIL CORNELIUS
BY
*Frye & Johnson*
ATTORNEYS

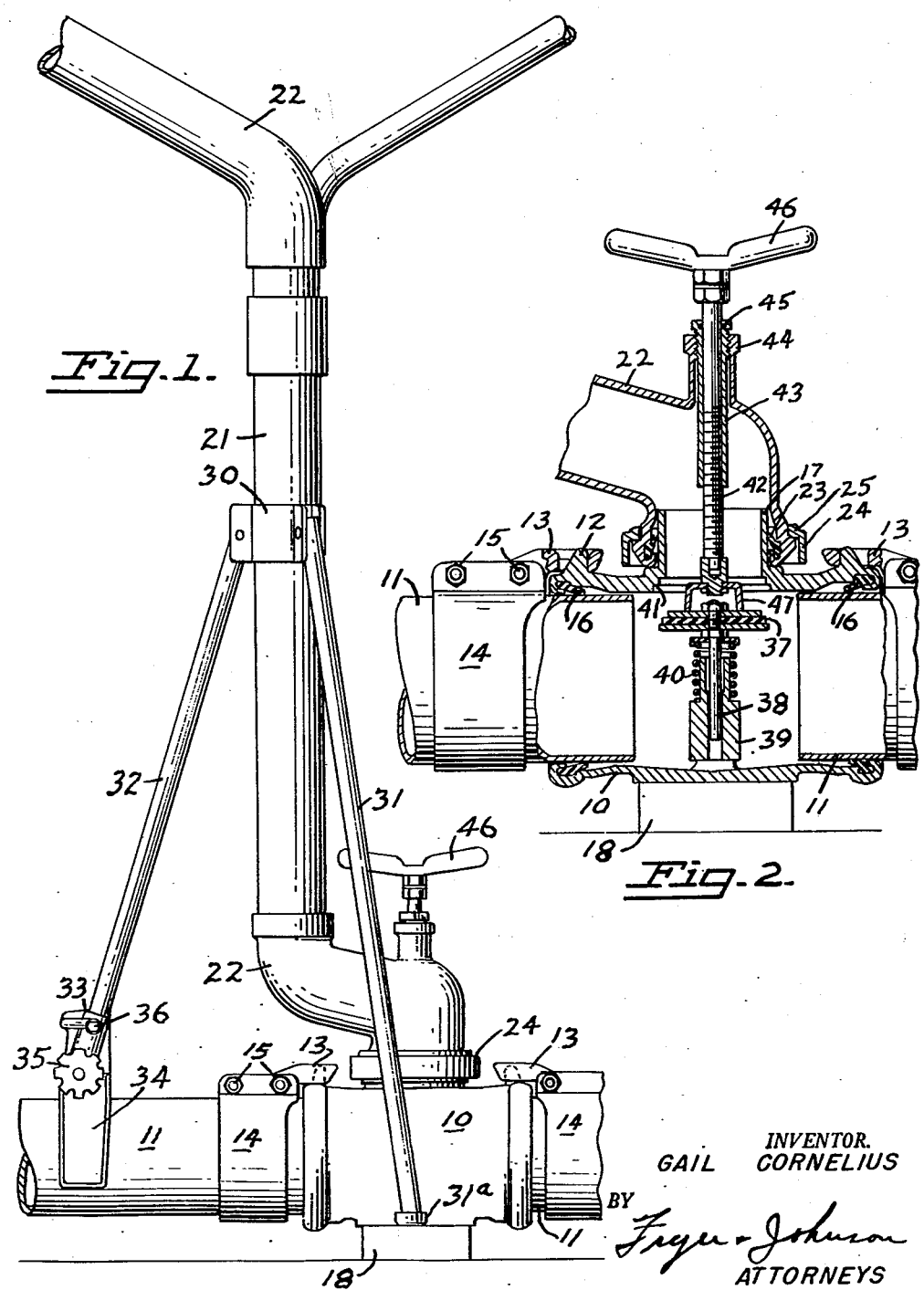

United States Patent Office 2,795,459
Patented June 11, 1957

2,795,459

IRRIGATION SPRINKLER MOUNTING

Gail Cornelius, Portland, Oreg., assignor to R. M. Wade & Co., Portland, Oreg., a corporation of Oregon Application October 3, 1955, Serial No. 538,013

3 Claims. (Cl. 299—58)

This invention relates to the mounting assembly for a portable irrigation sprinkler and particularly to the mounting of large sprinklers of the kind designed for use on high pressure lines where a single sprinkler head casts water over an area of two or more acres of ground.

In systems of the kind referred to, the pipe employed is usually of the light portable type and it is desirable that the sprinklers and their mountings be detachable and easily portable between several outlets in the same line.

It is the object of the present invention to provide a portable sprinkler mounting that is unusually stable and of light durable structure and capable of being attached to and detached from a line without cutting off the water pressure in the line.

Further and more specific objects and advantages of the invention are made apparent in the following specification wherein reference is made to the accompanying drawings.

In the drawings:

Fig. 1 is a view in side elevation of an irrigation sprinkler mounting embodying the present invention, Fig. 2 is an enlarged vertical sectional view of a portion of the mounting shown in Fig. 1, Fig. 3 is a plan view of the mounting shown in Fig. 1 with the upper portion of the riser broken away, Fig. 4 is a view in elevation as seen from the right side of Fig. 3, and Fig. 5 is a detail view in perspective showing a locking ring which forms a part of the mounting.

Referring to the drawings in detail, a coupling 10 is shown as connecting together two lengths of pipe 11 which form a part of a line to carry water under pressure. The coupling 10 is generally of the type shown in my assignee's Kellaher Patent No. 2,244,396 wherein latch parts 12 thereon are engaged by latch members 13 pivotally supported by collars 14 clamped to the pipes 11 as by bolts 15. One of the bolts 15 also pivotally supports the latch 13. Rubber seals 16 are disposed between the coupling and the pipe. The seals herein shown are the type disclosed in my assignee's patent to Cornelius No. 2,620,206 though, for the purpose of the present invention, any suitable sealing means may be employed. A sprinkler outlet 17 is formed centrally of the top portion of the coupling 10 and a spreader or a stabilizer bar 18 underlies the coupling to maintain it in an upright position. The stabilizer herein shown is constructed of wood and is secured to a coupling base 19 as by screws illustrated at 20. The stabilizer may, however, be formed of any suitable material and secured to the coupling in any desired manner.

A riser 21, which in practice, is usually about six feet in height, carries a sprinkler head 22 at its upper end. This sprinkler head, only partially shown, is of conventional construction and may be any one of several commercially available types which rotate when water under pressure is directed through them to cast a spray of water in a large circular pattern. The riser 21 is connected at its lower end as by threads, welding or other suitable means to an offset fitting 22. The lower end of this fitting slips over the outlet 17 of the coupling 10 and a water tight seal 23 is provided between the offset fitting and the outlet. A locking ring 24 surrounds the bottom of the offset fitting and has a flanged upper edge engaging therewith as indicated at 25. The ring 24 is provided with a pair of handles, illustrated at 26, by means of which it may be rotated to provide a lock which prevents removal of the offset fitting from the coupling. This ring which is shown in Fig. 5 is of conventional design and is made in two parts for assembly purposes. It includes two recesses 27 adjacent its lower edge which embrace locking lugs 28, shown in dotted lines in Fig. 3 to hold it in place.

In order to support the riser 21 and sprinkler 22 in an upright position, tripod legs are pivotally connected to the riser by means of an embracing collar 30. Two of these legs 31 rest at their lower ends in cups 31a secured to the spreader 18. These cups may be fastened to the spreader in any suitable manner or if desired depressions may be formed in the spreader in place of the cups. The third leg 32 has its lower end disposed in a socket 33 formed as a part of a split saddle 34 secured to one of the lengths of pipe 11 by a clamping screw with a hand wheel 35 thereon. A cap screw 36 retains the leg 32 in the socket 33. Upon loosening of the clamping screw by turning its hand wheel 35 the saddle is released from the pipe and the lower end of the leg 32 is free.

The coupling 10 contains a spring pressed check valve 37 (see Fig. 2) supported on a stem 38 slidably mounted in a guide 39. A spring 40 normally urges the check valve upwardly against a seat 41 to close the outlet 17. The offset fitting 22 contains a valve stem 42 which has a threaded connection with the interior of a tube 43 which is in turn threaded into a boss 44 rising from the upper portion of the offset fitting. A suitable packing ring or seal 45 is interposed between the valve stem and the tube 43. A handle 46 is provided at the upper end of the valve stem to enable it to be rotated for advancing it upwardly or downwardly. At its lower end, the valve stem has a cup 47 bearing against the valve 37. Consequently rotation of the valve stem in one direction will depress and open the valve 37 while rotation in the opposite direction will permit the valve to be closed under influence of the spring 40.

The sprinkler mounting herein shown may be easily removed from the line, and if the valve 37 is first permitted to close full pressure may be maintained in the line while the sprinkler is moved from one location to another.

When the assembly is set into position with the hand wheel 35 tightened and the locking ring 24 engaged, it is simply necessary to turn the valve stem 42 in a clockwise direction to effect depression and opening of the valve 37 to start operation of the sprinkler.

I claim:

1. A mounting for a sprinkler riser for detachably connecting it to an outlet in a water line which comprises, a spreader extending transversely of the line beneath the opening and having a cup-like recess on each side of the line, tripod legs secured at their upper end to the riser, two of said legs resting in said recesses and the third leg being detachably secured to the line at a point spaced from the outlet.

2. A mounting for a sprinkler riser for detachably connecting it to an outlet in a water line which comprises base means connected to the line adjacent the outlet and adapted to rest on the ground, tripod legs connected at their upper ends to the riser and detachably connected at their lower ends to said base means and said water line, a valve in the line resiliently urged upwardly to close said outlet, and valve actuating means carried with the riser and operable when the riser is in place over the outlet to depress and open said valve.

3. A mounting for a sprinkler riser for detachably connecting it to an outlet in a water line which comprises tripod legs connected at their upper ends to the riser and detachably connected at their lower ends to base means associated with the line, a valve in the line, resilient means to urge said valve upwardly to close said outlet, an offset fitting detachably secured to the outlet at its lower end and extending laterally and upwardly for connection with the lower end of the riser, and a rotatable valve stem threaded through the lateral portion of said fitting in alignment with said valve to depress and open the valve when the fitting is in place over the outlet.

References Cited in the file of this patent
UNITED STATES PATENTS

| | | |
|---|---|---|
| 2,034,933 | Wilson | Mar. 24, 1936 |
| 2,694,600 | Richey | Nov. 16, 1954 |
| 2,765,806 | Webster | Oct. 9, 1956 |